April 9, 1940. T. H. RIDYARD 2,196,274
AMUSEMENT DEVICE
Filed July 24, 1937 3 Sheets-Sheet 2
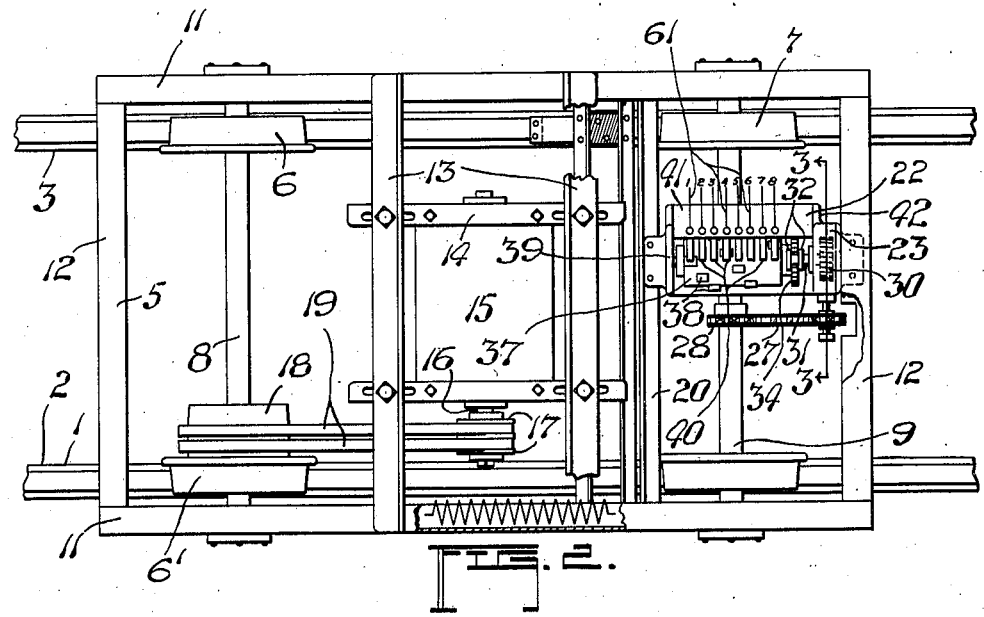
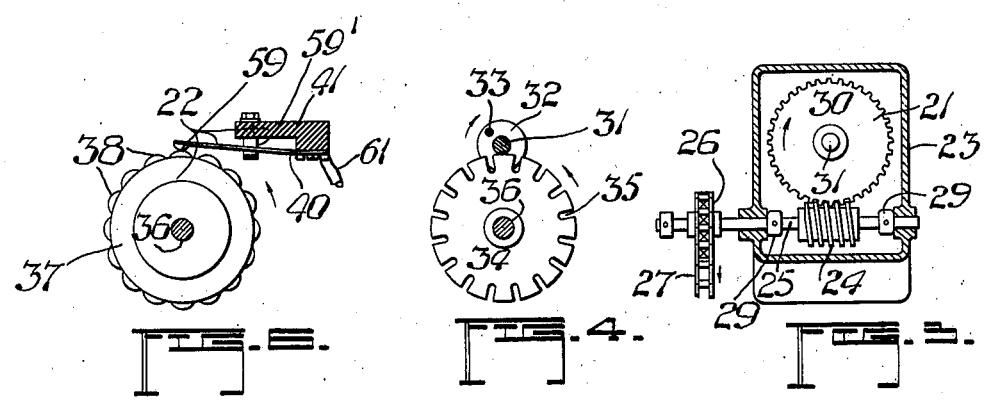
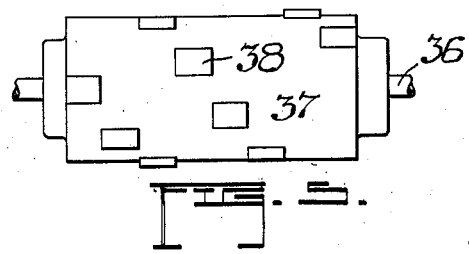
INVENTOR
THOMAS H. RIDYARD
BY Featherstonhaugh & Co.
ATTYS.

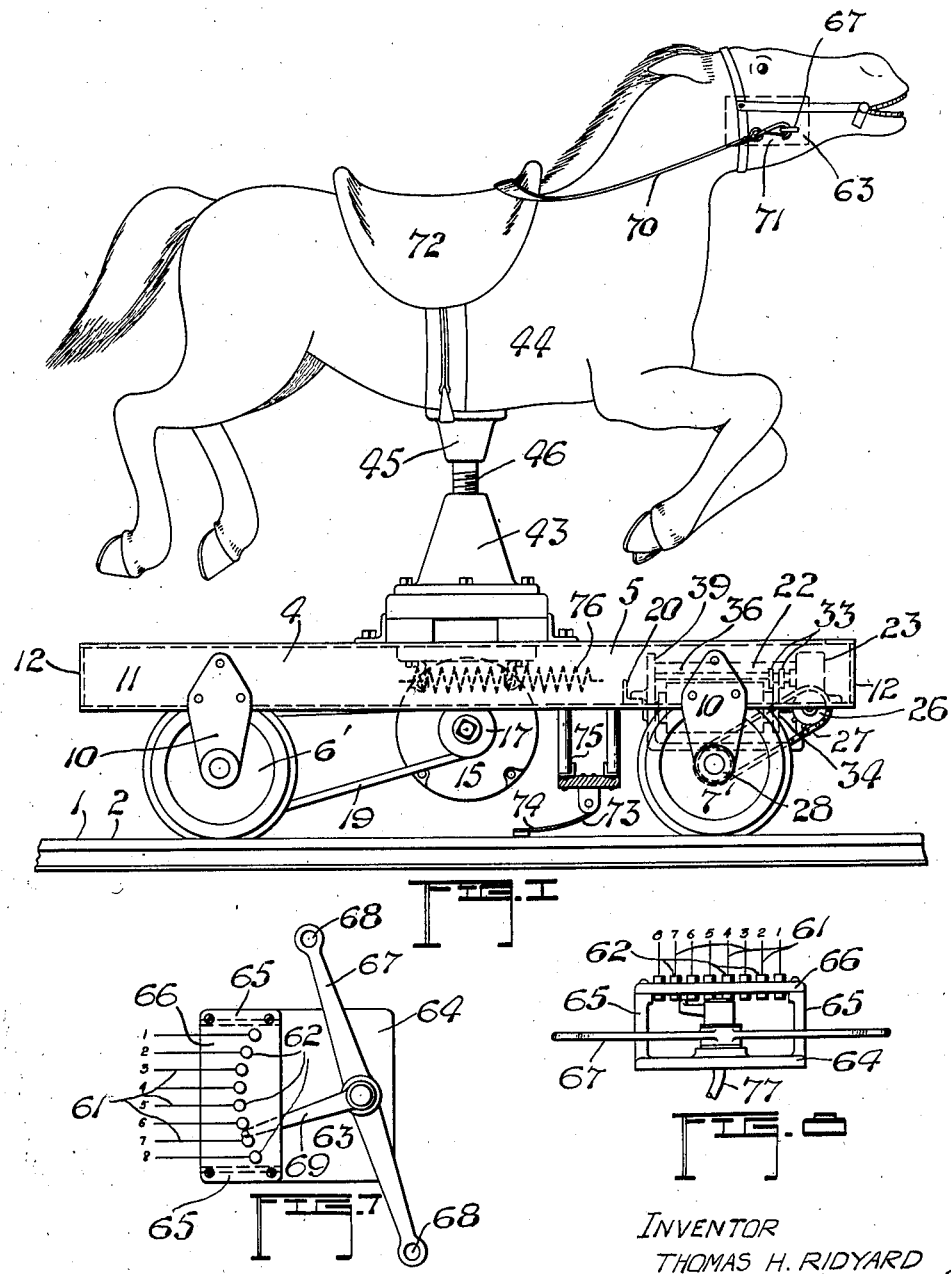

April 9, 1940.  T. H. RIDYARD  2,196,274
AMUSEMENT DEVICE
Filed July 24, 1937  3 Sheets-Sheet 3
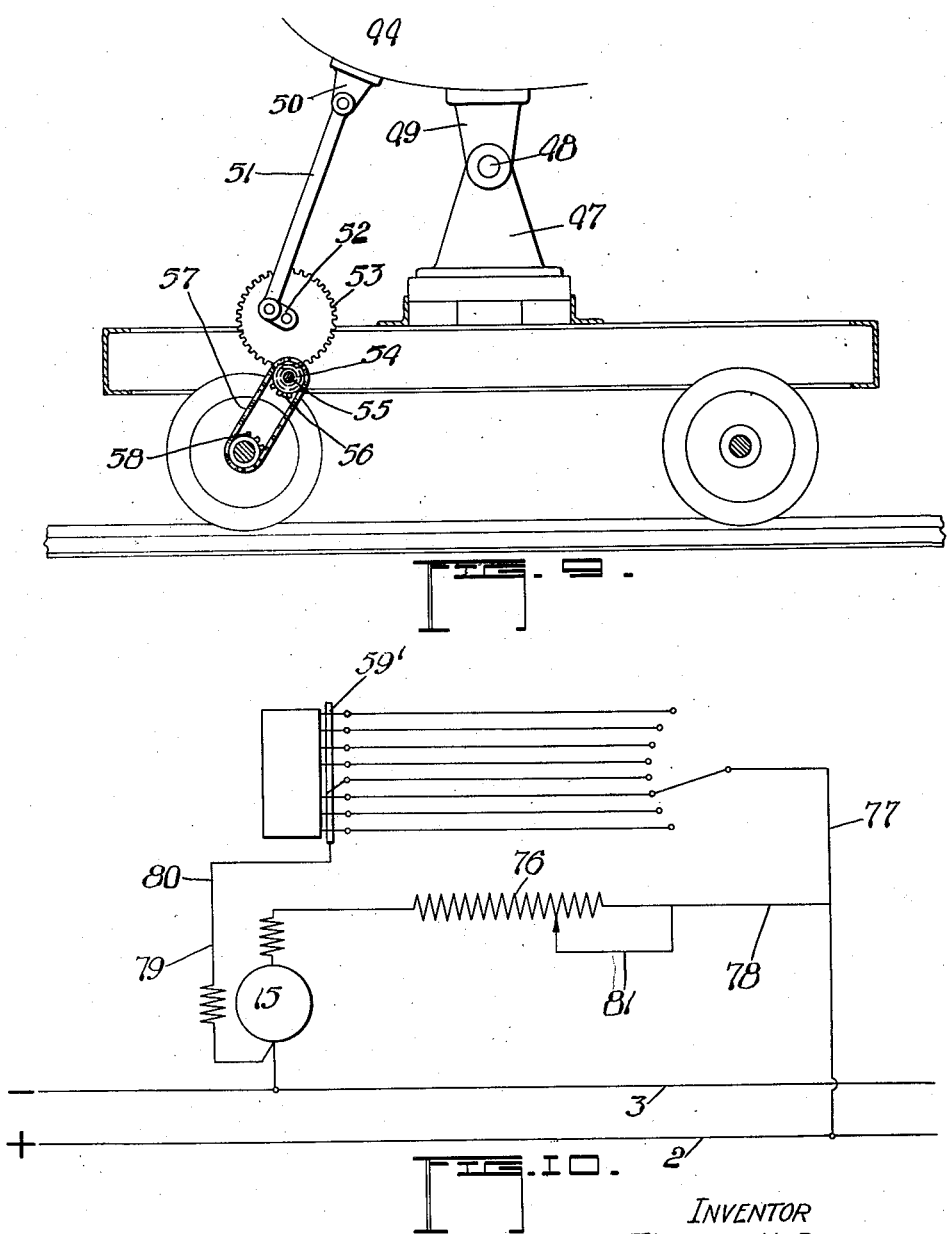
INVENTOR
THOMAS H. RIDYARD
BY Featherstonhaugh & Co.
ATTYS.

Patented Apr. 9, 1940

2,196,274

UNITED STATES PATENT OFFICE 2,196,274

AMUSEMENT DEVICE

Thomas Halsal Ridyard, Winnipeg, Manitoba, Canada, assignor to Edwin Barry Reynolds, Winnipeg, Manitoba, Canada Application July 24, 1937, Serial No. 155,525

8 Claims. (Cl. 104—61)

My invention relates to an amusement device for the entertainment of children and adults and an object of the invention is to provide a plurality of model horses sufficiently large to be mounted by riders, the horses themselves being mounted each upon a truck which runs on a track composed of a pair of parallel rails, a plurality of tracks being provided, each having a single truck and model horse running thereover.

A further object of my invention is to provide means whereby the rider of each horse may by manipulation of the bridle rein leading to the horse's head, vary the amount of electric current conducted through one of the rails in each track through a rail engaging shoe to a motor upon the truck, thereby controlling the speed with which the truck, horse and rider travel over each track.

A further object of my invention is to provide a cylindrical variable contact assembly upon each truck, the details of which will be explained hereinafter, the same being operated through one of the pairs of wheels upon each of the trucks, whereby the amount of current conducted to the motor upon each truck will be varied by means beyond the rider's control.

A further object of my invention is to provide means whereby in the case of an endless series of tracks, the speed of the motor upon each of the trucks may be varied according to the distance travelled in completing a circuit.

A further object of my invention is to provide means whereby the truck will accelerate rapidly upon high-speed contact being made, and means whereby speed will be rapidly arrested when high-speed contact is broken.

A further object of my invention is to provide means whereby each model horse will be rocked to stimulate the action of a live horse.

With the above more important objects in view and such other minor objects as may appear as the specification proceeds, my invention consists essentially in the arrangement and construction of parts all as hereinafter more particularly described, reference being had to the accompanying drawings, in which:

Fig. 1 is a side view of one of my model horses and truck mounted upon a track.

Fig. 2 is a plan view of my truck.

Fig. 3 is a section on the line 3—3 of Figure 2.

Fig. 4 is a detail showing my intermittent cylinder rotating motion.

Fig. 5 is a detail showing my multi-cam cylinder.

Fig. 6 is a detail showing my cylindrical variable contact assembly.

Fig. 7 is a plan view of my segmental variable contact assembly.

Fig. 8 is an end elevation of my segmental variable contact assembly.

Fig. 9 is a side elevation showing my model horse-rocking mechanism.

Fig. 10 is a diagram of my speed-controlling and motor circuit.

In the drawings like characters of reference indicate corresponding parts in the several figures.

In the carrying out of my invention, I employ as I have already stated, a plurality of parallel tracks 1, each track consisting of a pair of rails 2 and 3. The several tracks may be arranged in the form of a circuit or in the form of a straightaway, and in this connection, I would state at the outset that instead of employing a riding horse, I may if desired, for better entertainment value, make use of a number of chariots, each of which would be drawn by one or more model horses and in such a case, the operators would be seated in the chariot and would manipulate the lines leading to the horse's head in a similar manner to that about to be explained in connection with the embodiment illustrated in the drawings accompanying this application.

Upon each of the tracks 1 is a truck 4 consisting of a chassis 5 mounted upon two pairs of flanged wheels 6 and 6', 7 and 7', each of the wheels being mounted upon axles 8 and 9, and connected to the chassis as by means of the bearings 10.

The chassis as shown upon the drawings accompanying this application, consists of a pair of longitudinally extending side members 11, end members 12 at front and rear and a pair of medially spaced lateral members 13, brackets 14 being secured to the members 13 to support the motor 15. Upon the outer end of the armature shaft 16 of the motor, I provide one or a pair of V-belt pulleys 17, these pulleys being in alignment with a pair of similar but larger pulleys 18 keyed to the axle 8 of the truck so that when the motor is activated, the truck will move over the rails 2 and 3 through the connection between the pulleys 17 and 18 of a pair of V-belts 19.

Upon the forward underside of the truck 4 and secured between the front cross member 12 and an intermediate cross member 20 is mounted a transmission assembly 21 and a cylindrical variable contact assembly 22, the transmission assembly being contained within a housing 23 and consisting of a worm gear 24 mounted upon a shaft 25, journalled in the sides of the housing 23, the said shaft being provided upon the outer end with a sprocket wheel 26 keyed thereto, a sprocket chain 27 passing over the said sprocket wheel, and over a similar sprocket wheel 28 keyed to the axle 9.

The shaft 25 which it will be noted is restrained against end shiftable movement by means of collars 29, is rotated by the movement forward of the truck over the rails as will have been obvious from this description and the drawings accompanying this application, and when it is so rotated, the worm 24 also rotates and imparts a similar action to the pinion 30 in the direction of the arrow. This pinion is keyed to a shaft 31 which may also be journalled at one end in one wall of the transmission housing, the said shaft extending rearwardly and terminating in a pair of discs 32 which are keyed to the shaft and have an offset stud 33 extending between them, these discs forming part of an intermittent cylinder rotating motion now to be described.

It will be seen that the periphery of the shaft 31 is in propinquity with the periphery of a radially slotted wheel 34, but it is not in bearing relations therewith, and it will be seen by an inspection of Figure 4 of the drawings accompanying this application that when the member 32 rotates one complete revolution, the stud 33 will enter one of the radial slots 35, thus causing a partial revolution in the member 34.

The member 34 is keyed to a shaft 36 which in turn rotates a multi-cam cylinder 37, the cams 38 thereupon being arranged in staggered relation or otherwise as may be desired, the shaft 36 upon which the multi-cam cylinder is mounted being journalled in an end plate 39.

The multi-cam cylinder just described forms part of my cylindrical variable contact assembly, the remainder of this assembly proper consisting of a plurality of aligned spring switches 40, each of which is secured at its root in an insulating block 41, suitably secured above and to one side of the cylinder 37 between the plate 39 and the plate 42.

Upon the upper surface of the chassis 4, I provide a pedestal assembly 43, the same being suitably secured to the chassis, and in Figure 1 of the drawings accompanying this application, the model horse 44 is illustrated as resting upon and secured to a crown piece 45 to which is attached a screw threaded column 46. A preferred embodiment, however, is illustrated in Figure 9 of the drawings accompanying this application, and in this figure, it will be seen that the pedestal consists of a pair of plates 47, the apex of which is drilled to receive a stub shaft 48 upon which is pivoted a bracket 49 secured to the horse's belly, the weight thereof resting upon the same and in this embodiment, it will be noted that adjacent the bracket 49 and also secured to the belly of the animal is a secondary bracket 50 to which is pivotally secured a link 51. The opposite end of this link is pivoted to a crank arm 52, the crank arm being rotated by a pinion 53. The pinion 53 is rotated by a smaller pinion 54 keyed to a shaft 55 upon which is also keyed a bracket wheel 56. The bracket wheel is rotated by a chain 57 which extends around a similar bracket wheel 58 keyed to the axle 8.

In this way, the model horse 44 is made to rock as the truck travels over the trails upon the stub shaft 48, but no particular novelty is claimed for this particular rocking motion or the herein described method of imparting the same.

The switches 40 are provided each with an attached head 59 of insulating material, and secured at its upturned ends to the block 41 is a contact bar 59'. Insulated leads 61 are secured to the switches 40, there being one lead secured to each switch. These leads are brought together into cable form and travel along underneath the chassis 4, and up through the pedestal 43, the cable being not shown in the drawings accompanying this application in view of this description. The cable extends on upwardly through the body of the model horse 44 through the neck and into the head, whereat the leads fan out and are secured to terminals 62, these terminals being arranged in an arcuate arrangement to form part of what I call a segmental variable contact assembly 63.

This assembly consists of a base plate 64, side walls 65 and a top plate 66, through which the terminals 62 extend, these terminals being of the flat headed type. Pivotally mounted in the plate 64 is a cross arm 67, provided with eyes 68 at each end thereof, this member corresponding to the bit placed in a horse's mouth when riding or driving, and secured to the centre of the cross arm is a contact arm 69 which by rotative movements of the cross arm 67, travels over the heads of the terminals 62. A bridle rein is connected by snap fasteners 71 to the eyes of the member 67 and the arrangement, as will later be described, is such that when a rider is seated upon the saddle 72 of the horse, he may, by pulling the bridle rein upon one side or the other break a circuit such as will enable him to accelerate the movement of the truck over the track for a certain distance, after which, the truck will decelerate for the reason presently to be described and a new "hot spot" will have to be found among the terminals 62.

Beneath the chassis 4 upon one side thereof is secured a shoe assembly 73 consisting of the shoe 74 itself and a suitable bracket 75 by means of which the shoe is secured to the chassis. The shoe 74 picks up current from the positive rail 2 and I would here mention that the wheels 6 and 7 are insulated from the rest of the chassis and from the wheels 6' and 7' which ride the negative rail 3.

The current proceeds from the shoe to a resistance 76 being also tapped off on the line side of the resistance through a lead 77 to the contact bar 63. The current which proceeds through the resistance 76 proceeds on through the series field and armature of my motor (which is of the compound wound direct current type) and constitutes what I term a "high speed" or series circuit 78 owing to the fact that when current is passing only therethrough, my vehicles are travelling at a higher speed.

The contact bar 59 is connected electrically with the shunt field 79 of my motor and proceeding now to outline the operation of my device, it will be obvious that as the truck travels over the track, the multi-cam cylinder 37 will be rotated slowly and intermittently through the intermittent cylinder rotating action illustrated in Figure 4, of the drawings accompanying this application, this action in turn being rotated by the worm and pinion located in the transmission housing 23, the movement of which is governed by the sprocket assembly 26, 27 and 28 motivated from the forward wheel 7 and 7'.

As the multi-cam cylinder rotates, the various switches 40 will break contact with the contact bar 59' as the portions 59 ride the cam faces and in this connection, I would point out that the cam portions upon the cylinder need not be staggered in the manner shown but may be arranged in any manner that may be desired or may be arranged so that they can be easily interchanged and moved about upon the periphery of the cylinder.

As the ends of the switches ride the faces of the cams, contact is broken between the said switch and the contact bar 59' and current cannot now travel through the particular lead 61 to which the lifted switch is connected. To boost the speed of the motor 15 and the vehicle, it is necessary to break the shunt or "slow speed" circuit 80 which is that which runs through the lead 77, through the segmental contact assembly and the cylindrical bar contact assembly through the shunt field of the motor. To accomplish this, the rider has to manipulate his reins so that the contact bar 63 connects with the switch which is at that moment lifted and has therefore broken the circuit 80, thus allowing current to flow only through the series circuit 78 and rotate the motor at the higher speed.

By skill exercised by the rider in selecting the particular terminal which is connected to the switch 40 lifted at that moment, the horse, truck and rider will traverse the course at a greater speed than if less ability is shown in this respect and I would point out that the reason I use a compound wound direct current motor upon each of my trucks is for the purpose of arresting more rapidly the speed of the truck over the track when the secondary circuit is open as this has the necessary effect in an amusement device of exciting the senses and causes greater satisfaction to be manifested when the right terminal is found through actuation of the bridle rein for opening the shunt circuit again.

It should be understood that after passing through the series field 78 and armature of the motor 15 as described hereinabove and through the shunt circuit as also described, the current returns to the negative rail 3 through the chassis 4, the negative armature brush lead (not shown) and the negative shunt field lead (also not shown) being connected to the chassis frame to permit completion of the circuit at this point.

From the foregoing, it will be seen that I have provided a device which will provide pleasure through the innocent competition of each rider attempting to manipulate the reins of his mount in such a way that the maximum speed will be obtained as frequently as possible as he travels around his track, thus overtaking those on other tracks.

Although I have described in this specification and have illustrated in the drawings accompanying the same, a truck bearing a mountable model horse, and although I have mentioned the possibility of employing a chariot to be drawn behind a truck upon which is mounted a model horse or horses, it will be understood that the chariot itself may contain mechanism described for moving and varying the speed of the vehicle.

I would also particularly point out, however, that the mechanical principles employed in this amusement device might be applied to any number of other devices designed to travel over a course. Such devices might be in the form of model aeroplanes suspended from a single rail track or, on the other hand, a vehicle might be propelled over the ground at varying speeds employing the same mechanical principles but without using a track so that further amusement would be extracted through guiding the vehicle over a wide electrified course. This would be particularly desirable in the case of mountable horses as the riders could guide their mounts and overtake other riders, thus "cutting out" the overtaken rider as is the practice in genuine horse racing.

I would also mention in connection with a mountable horse designed for travel over a wide electrified course and therefore capable of being guided from side to side therealong to increase the amusement that in such a case, the reins would govern the direction and I would then provide a rider controlled contact arrangement through stirrups so that by means of a connection equivalent to applying spurs to his mount, a person could vary the speed thereof.

In a chariot race over a wide course, the reins might also govern the direction and in this case, the manually controlled speed factor might be governed by means of a whip contact which would provide great amusement, the whip carrying an insulated lead which would correspond roughly to the shunt circuit herein described and when contact is made by the end of the whip with a particular contact or area upon the body of the horse, the speed would be increased.

I would also draw attention to the fact that if desired, the mechanism described in the specification might be housed in the body of the horse in which case, the horse would be mounted on wheels connected to the hoofs or to a simplified chassis.

Also in connection with this invention I would mention that if desired means might be provided whereby the increase of speed might be determined entirely by the rider or driver as in this case as in the case of the invention hereinbefore described, it will have been noted that if the contact arm 63 is allowed to remain stationary throughout the progress of the race, there will be certain times during the revolution of the cam 37 when the shunt circuit will be broken and the speed increased.

It should also be mentioned that if desired, I may cause the mechanism in the head of the horse to perform a purely artificial function or in other words, this mechanism may be dummy mechanism. In this case, the speed controlling mechanism in the chassis 4 will be the only means for varying the speed thereof but by operating the bridle reins, the rider will believe that he is controlling the speed of his mount.

Such a device would be particularly desirable when a course is designed for use by children and to effect such a function as I have just described, all that is necessary would be to close permanently the connection between the contact arm 63 and the terminal 62. The cross arm 67 could then be pivoted for idle movement.

Finally I would mention in connection with my resistance 76 that I provide a shunt 81 which may be varied according to whichever track in a circular arrangement that particular truck is upon. Thus if a truck is upon one of the inner circuits, it will travel more slowly than if it is upon one of the outer circuits and in order to effect a decrease in the speed, a greater resistance will have to be employed.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. In an amusement device, the combination of a movable object; means for driving said object; and means for varying the speed of movement of the object, including player operable means movable to different positions to obtain different speeds, and means not operable by the player but mounted on the object and actuated by the driving means of the object for determining at which position of the player operable means a high speed may be obtained and for periodically changing the same, said object-mounted means operating independently of the player operable means.

2. In an amusement device the combination of a movable object adapted to carry a player; means for driving the object, including an electric motor mounted on the object and an electrical circuit for said motor; and means on the object for varying the speed of the motor, including a plurality of fixed contacts in parallel in the circuit and a movable contact in the circuit, the movable contact being manually operable to engage any one of the fixed contacts to close the circuit, and an automatic switch actuated by the movement of the object for periodically making and breaking the circuit through each of the several fixed contacts.

3. In an amusement device the combination of a movable object adapted to carry a player; means for driving the object including an electric motor mounted on the object; a circuit for operating the motor at comparatively high speed; a circuit for operating the motor at a lower speed; a plurality of fixed contacts in parallel in one of the circuits; a movable contact in the said circuit operable by a player to engage any one of the fixed contacts to close the circuit; and an automatic switch actuated by the movement of the object and not controllable by the player, for periodically making and breaking the circuit through each of the several fixed contacts.

4. In an amusement device the combination of a movable object adapted to carry a player; means for moving the object including an electric motor mounted on the object; a circuit for operating the motor at comparatively high speed; a shunt circuit for operating the motor at a lower speed; a plurality of fixed contacts in parallel in the shunt circuit; a movable contact in the shunt circuit operable by the player to engage any one of the fixed contacts to close the circuit; and an automatic switch, actuated by the movement of the object and not controllable by the player, for periodically making and breaking the circuit through each of the several fixed contacts.

5. In an amusement device, the combination of a plurality of movable objects adapted to carry players; means for normally moving all of said objects at substantially equal speeds; independent means for varying the speed of each object, including player operable means on each object movable to different positions to obtain different speeds, and automatic means mounted on each object, for determining at which position of the player operable means a high speed may be obtained and for periodically changing the same, said automatic means co-operating with but operating independently of the player operable means, the speed varying means on each object being of substantially identical construction so that, subject to the chance and skill involved in the operation of the control means by the players, all the objects will travel a given course in substantially the same time.

6. In an amusement device the combination of a movable object; means for driving said object, including an electric motor and an electrical circuit; and means for varying the speed of the object, including fixed contacts arranged in parallel in the circuit, a movable contact in the circuit operable by a player to engage any one of the fixed contacts, and an automatic switch including a rotatable member mounted on the object and having a plurality of cams thereon, driving means operated by a moving part of the object for rotating the rotatable member, and a plurality of brushes adapted to be engaged and lifted by said cams as the rotating member rotates to periodically make and break the circuit through each of the fixed contacts.

7. In an amusement device the combination of a movable object; means for driving said object, including an electric motor and an electrical circuit; and means for varying the speed of the object, including fixed contacts arranged in parallel in the circuit, a movable contact in the circuit operable by a player to engage any one of the fixed contacts, and an automatic switch for periodically breaking the circuit through each of the fixed contacts in the circuit, said switch including an intermittently rotatable member having a plurality of cams thereon, said member being mounted on the object and rotated by the movement of the object, and a plurality of brushes adapted to be engaged by said cams as the rotating member rotates, the periods of rest of the intermittently rotating member coinciding with the brush engaging positions of the cams.

8. In an amusement device, the combination of a movable object adapted to carry a player; and means for controlling the speed of movement of said object when in motion, including means on the object positively adjustable by a player to vary the speed of the object, means for increasing the speed of the object adapted to be activated at all times while the device is in operation by at least one adjustment of the player adjustable means, and means mounted on the object and actuated independently of the player adjustable means by the movement of the object, for determining at which adjustment of the player adjustable means the speed increasing means will be activated, and for periodically changing the same.

THOMAS HALSAL RIDYARD.